United States Patent [19]
Barth et al.

[11] Patent Number: 5,060,526
[45] Date of Patent: Oct. 29, 1991

[54] LAMINATED SEMICONDUCTOR SENSOR WITH VIBRATING ELEMENT

[75] Inventors: Phillip W. Barth, Palo Alto; Kurt E. Petersen, San Jose; Joseph R. Mallon, Jr., Fremont, all of Calif.

[73] Assignee: Schlumberger Industries, Inc., Norcross, Ga.

[21] Appl. No.: 358,771

[22] Filed: May 30, 1989

[51] Int. Cl.$^5$ .............................................. G01L 1/10
[52] U.S. Cl. .......................... 73/862.59; 73/517 AV; 73/702; 73/778
[58] Field of Search ............ 73/702, 704, 778, 862.59, 73/DIG. 1, DIG. 4, 703, 721, 727, 517 AV

[56] References Cited

U.S. PATENT DOCUMENTS

| | | | |
|---|---|---|---|
| 4,498,344 | 2/1985 | Dinger | 73/778 |
| 4,594,898 | 6/1986 | Kirman | 73/862.59 |
| 4,601,779 | 7/1986 | Abernathy et al. | 156/628 |
| 4,649,267 | 3/1987 | Abernathy et al. | 29/571 |
| 4,813,271 | 3/1989 | Greenwood | 73/778 |

FOREIGN PATENT DOCUMENTS

| | | |
|---|---|---|
| 2121953 | 1/1984 | United Kingdom . |
| 2162314 | 1/1986 | United Kingdom . |
| 2183040 | 5/1987 | United Kingdom . |

OTHER PUBLICATIONS

Kyoichi Ikeda et al., "Silicon Pressure Sensor with Resonant Strain Gages Built Into Diaphragm", Technical Digest of 7th Sensor Symposium, 1988, pp. 55–58.
Kyoichi Ikeda et al., "Three Dimensional Micromachining of Silicon Resonant Strain Gage", Technical Digest of 7th Sensor Symposium, 1988, pp. 193–196.
Roger T. Howe, "Resonant Microsensors", Digest of Technical Papers, 4th Internat'l, Conference on Solid State Sensors and Actuators (Transducers '87) by Institute of Electrical Engineers of Japan, pp. 843–848.
Roger T. Howe et al., "Resonant-Microbridge Vapor Sensor", IEEE Transactions on Electron Devices, vol. ED-33, No. 4, Apr. 1986.
R. T. Howe et al., "Frequency Response of Polycrystalline Silicon Microbridges", 1985 IEEE, pp. 101–104.
J. C. Greenwood, "Etched Silicon Vibrating Sensor", Phys. E.: Sci Instrum., vol. 17, 1984, by The Institute of Physics, (Great Britain).
R. M. Langdon, "Resonant Sensors-A Review", J. Phys. E. Instrum., vol. 18, 1985 (Great Britain).
B. Hok, "Vibration Analysis of Microchemical Elements", Sensors and Actuators, 8 (1985), pp. 235–243.
Harvey C. Nathanson et al., "The Resonant Gate Transistor", IEEE Transactions on Electron Devices, vol. ED-14, No. 3, Mar. 1967, pp. 117–132.
M. B. Othman et al., "Electrically Excited Silicon Beam Mechanical Resonators", Electronic Letters, 2nd Jul. 1987, vol. 23, No. 14.
S. Middelhock et al., "Sensors with Digital Frequency Output", Sensors and Actuators, 15 (1988), pp. 119–133.
H. C. Nathanson et al., "A Resonant-Gate Silicon Surface Transistor with High-Q Band-Pass Properties", Applied Physics Letters, vol. 7, No. 4, pp. 84–87.

Primary Examiner—Donald O. Woodiel
Attorney, Agent, or Firm—Sanford J. Asman

[57] ABSTRACT

An electromechanical sensor is provided which comprises: a first silicon wafer which defines a resonant element; wherein the resonant element is doped with approximately the same impurity concentration as a background dopant concentration of the first wafer; and a second single crystal wafer which defines a device for coupling mechanical stress from the second wafer to the resonant element; wherein the first and second wafers are fusion bonded together.

85 Claims, 10 Drawing Sheets

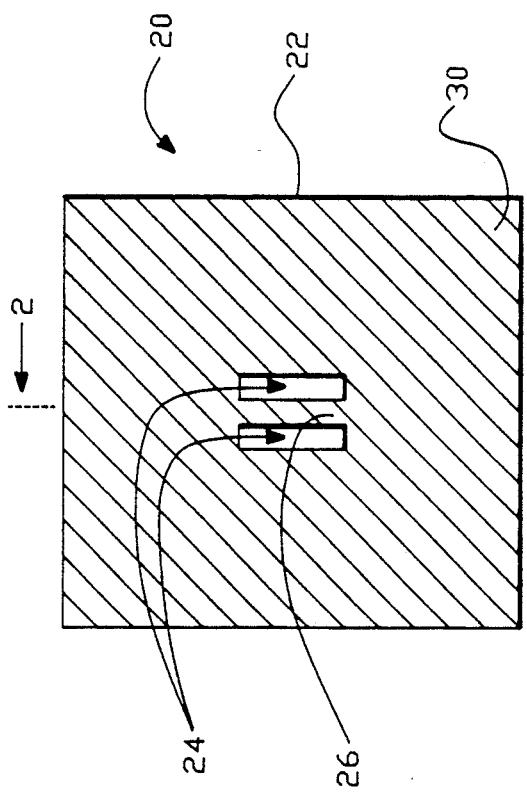
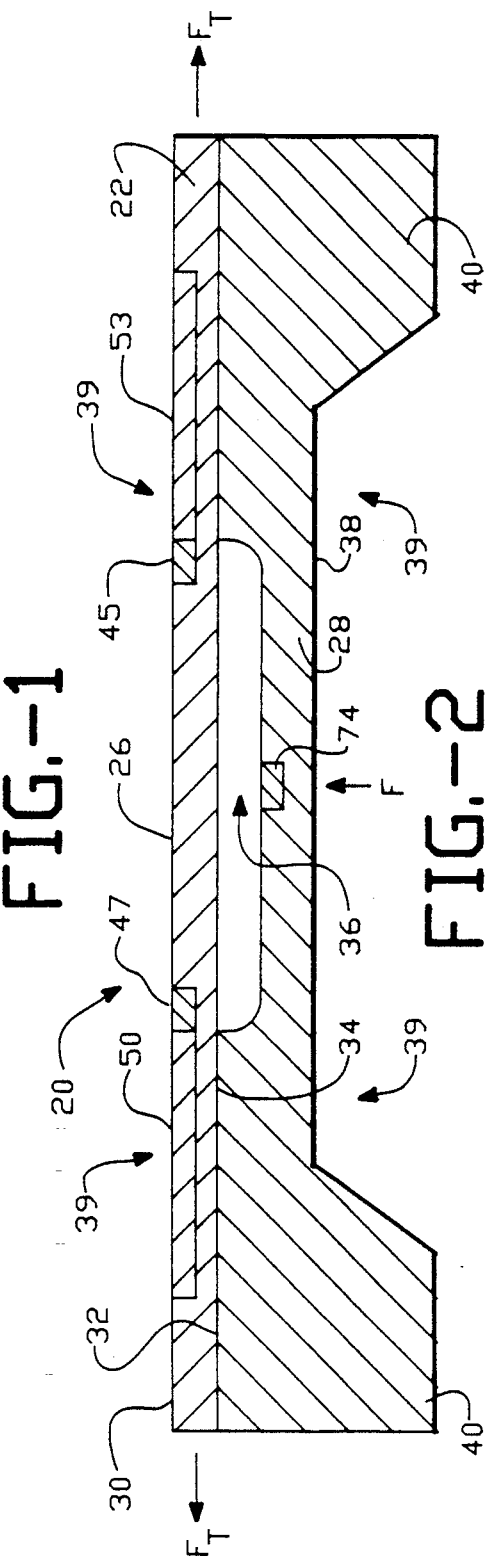
FIG.-1
FIG.-2

FIG.—5

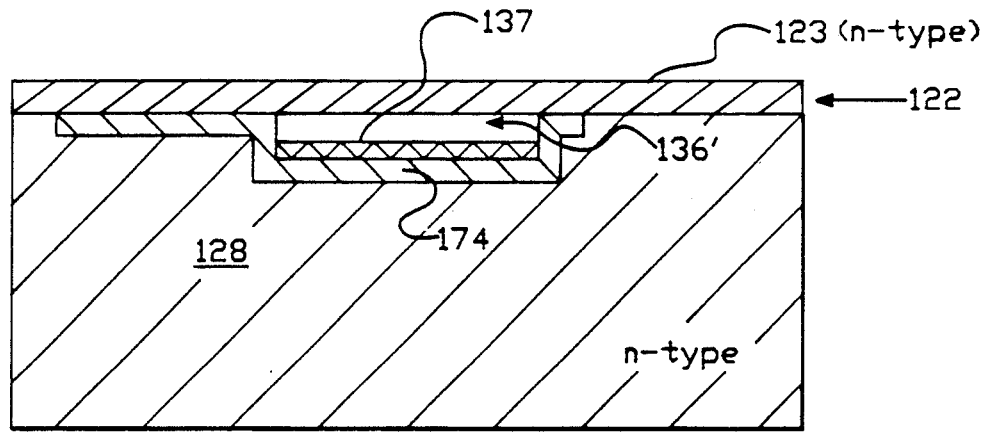
FIG.−8D
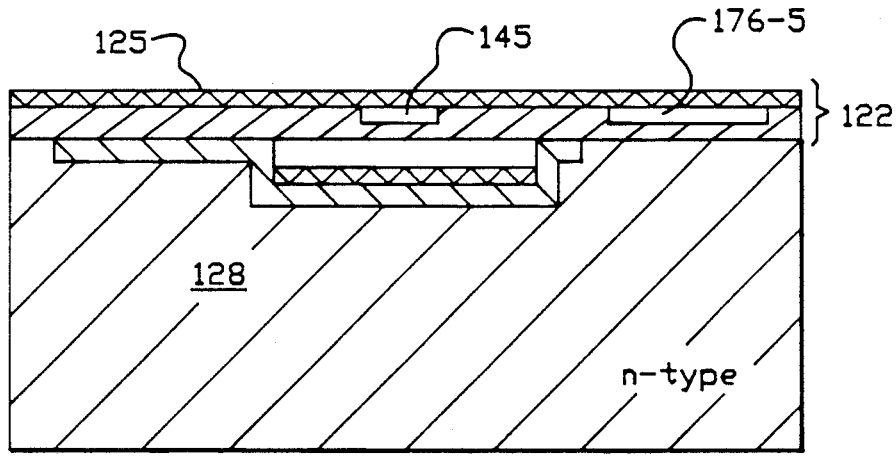
FIG.−8E
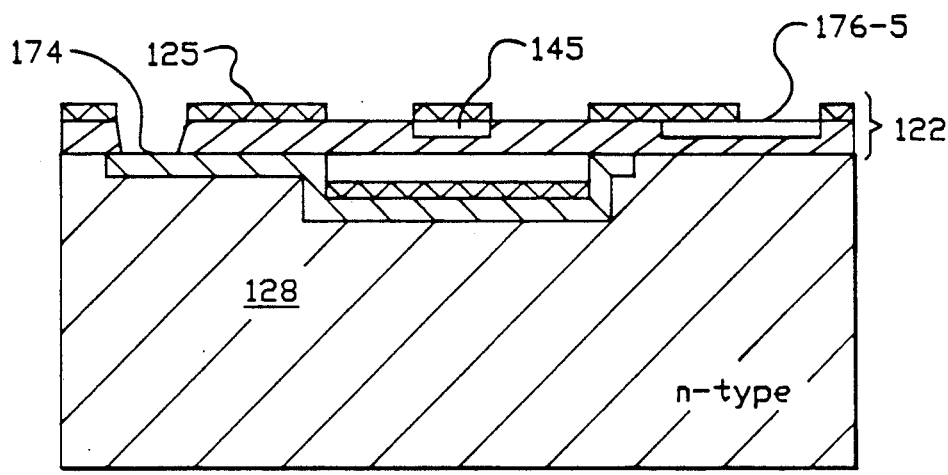
FIG.−8F

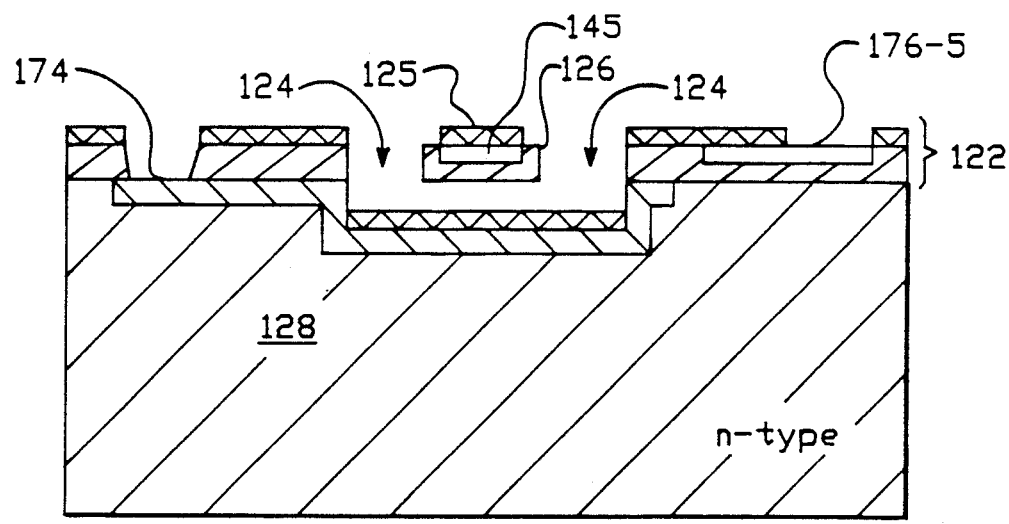
FIG.—8G
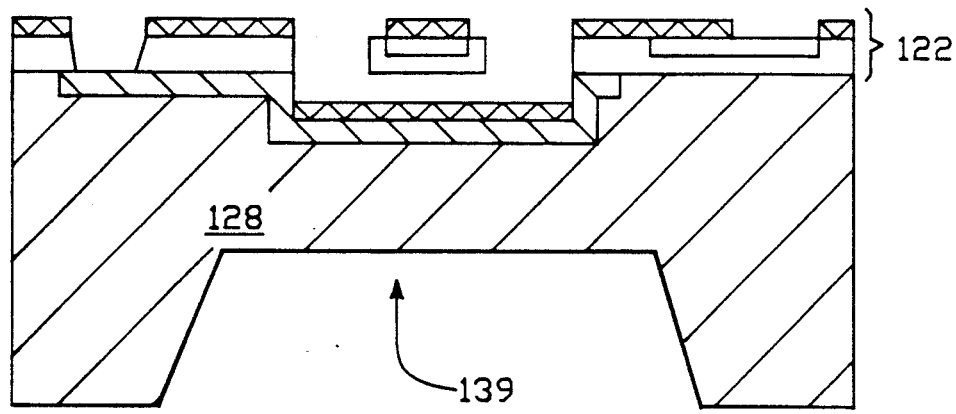
FIG.—8H

LAMINATED SEMICONDUCTOR SENSOR WITH VIBRATING ELEMENT

BACKGROUND OF THE INVENTION

1. Field of the Invention

The invention relates generally to sensors and more particularly to semiconductor electromechanical sensors that include a vibrating element.

2. Description of the Related Art

A variety of sensors have been built which are based on the principle that the resonant vibrational frequency of a vibratable element depends upon the stress applied to it. For example, sensors using a vibratable element have been built which can measure such diverse physical parameters as acceleration, viscosity, fluid flow rate and pressure.

Semiconductor electromechanical sensors employing vibratable elements offer numerous advantages such as small size, batch fabrication, relatively high values of Q and the availability of well-developed semiconductor processing technologies. Semiconductor sensors have been constructed in which the vibratable element, for example, comprises a cantilever beam or a microbridge.

While earlier semiconductor sensors generally have been successful, there have been shortcomings with their use. In particular, for example, mismatches in the materials present in such prior sensors can lead to a degradation in sensor performance. For example, sensors employing a cantilever beam or a microbridge often suffer from mismatches in coefficients of thermal expansion as between the beam or microbridge and the semiconductor substrate of the sensor. Additionally, for example, the Young's Modulus of the beam or microbridge of earlier sensors often is not well matched with the Young's Modulus of the substrate. Furthermore, for example, residual strains often are present in such sensors as a result of the variety of material types employed in the sensors.

Moreover, earlier semiconductor sensors, of a type that employ an electrostatic drive apparatus to stimulate vibration of a vibratable element or that employ a capacitive pick-up apparatus to measure the resonant frequency of the vibratable element, often use an additional semiconductor wafer to embody the drive apparatus or the pick-up apparatus. Often, avoiding the use of such an additional wafer can be desirable.

Thus, there has been a need for a semiconductor sensor that substantially does not suffer from mismatches in the materials employed in the sensor. In particular, there is a need for such a sensor that substantially does not suffer from mismatches in coefficients of thermal expansion or Young's Modulus and that does not suffer from internal residual strains. There also exists a need for such a sensor in which electrostatic drive or capacitive pick-up can be readily employed without the need for an additional semiconductor wafer. The present invention meets these needs.

Furthermore, both the electrical and mechanical properties of semiconductors are temperature dependent. Consequently, for example, the resonant frequency of a cantilever beam or a microbridge can be temperature dependent. Thus, there exists a need for a semiconductor sensor in which temperature can be closely monitored. The present invention also meets this need.

SUMMARY OF THE INVENTION

In one embodiment, the invention provides an electromechanical sensor in which a first single crystal silicon wafer defines a resonant element which is doped with less than approximately $7.0 \times 10^{19}$ dopant atoms per cubic centimeter. A second single crystal silicon wafer defines a device for coupling mechanical stress from the second single crystal silicon wafer to the resonant element.

In another embodiment, the invention provides an electromechanical sensor in which a first single crystal silicon wafer defines a resonant element. The resonant element is doped with approximately the same impurity concentration as a background dopant concentration of said first wafer. A second single crystal wafer defines a device for coupling mechanical stress from the second wafer to the resonant element. The first and second wafers are fusion bonded together.

These and other features and advantages of the present invention will become more apparent from the following description of exemplary embodiments thereof, as illustrated in the accompanying drawings.

BRIEF DESCRIPTION OF THE DRAWINGS

The purpose and advantages of the present invention will be apparent to those skilled in the art from the following detailed description in conjunction with the appended drawings in which:

FIG. 1 is a top plan view of a first silicon wafer of a first embodiment of a sensor in accordance with the invention;

FIG. 2 is a cross-sectional view generally along line 2—2 of the sensor of FIG. 1;

FIGS. 8A-8H illustrate steps of a method in accordance with the invention for producing the sensor of FIG. 6;

DESCRIPTION OF THE PREFERRED EMBODIMENTS

Figure 3:
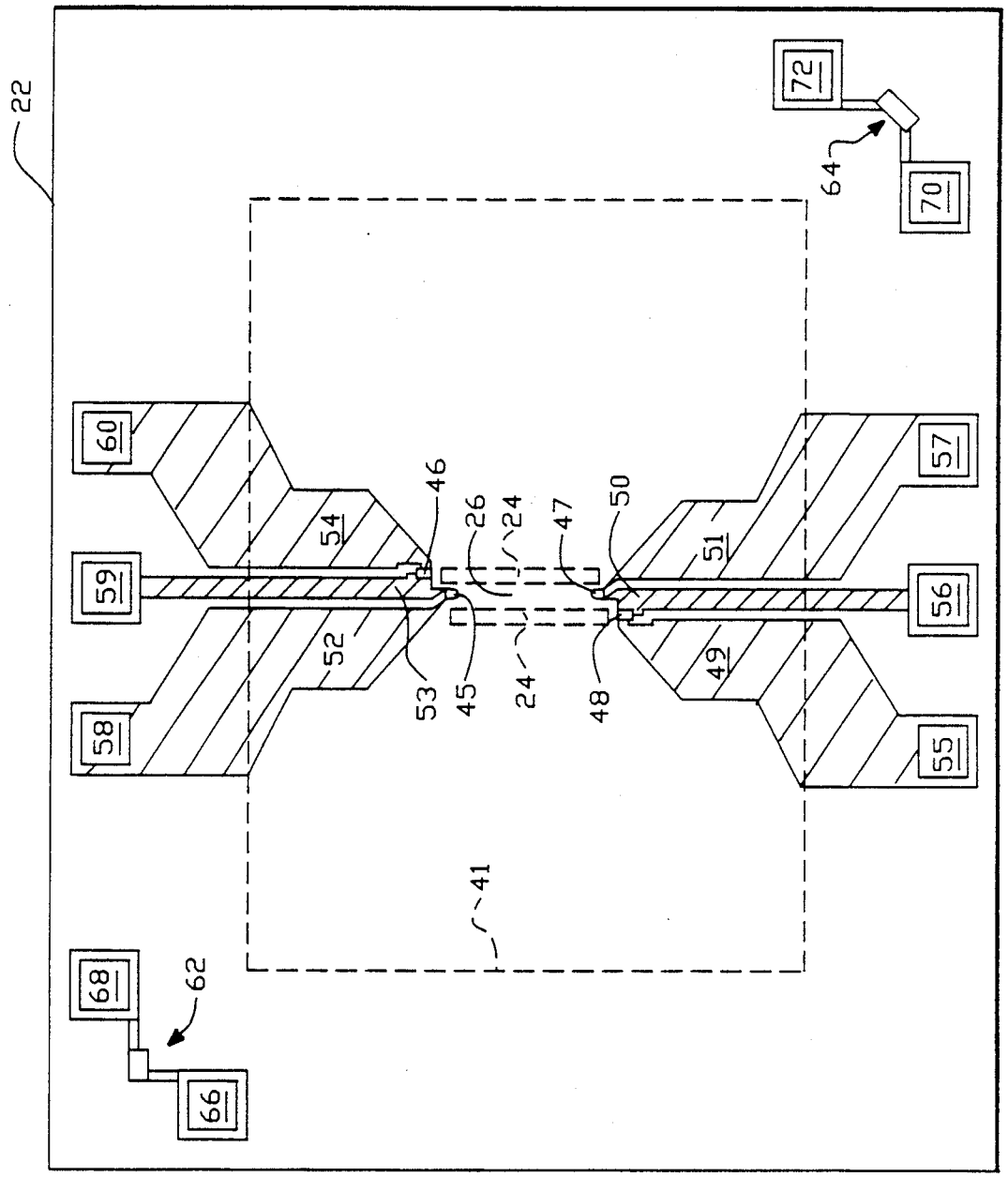
FIG. 3 is a more detailed top plan view of the first wafer of the sensor of FIG. 1.

The present invention comprises a novel semiconductor electromechanical sensor and an associated method and an associated product. The following description is presented to enable any person skilled in the art to make and use the invention, and is provided in the context of a particular application and its requirements. Various modifications to the preferred embodiments will be readily apparent to those skilled in-the art, and the generic principles defined herein may be applied to other embodiments and applications without departing from the spirit and scope of the invention. Thus, the present invention is not intended to be limited to the embodiments shown, but is to be accorded the widest scope consistent with the principles and features disclosed herein.

FIG. 1 shows a top plan view of a first silicon wafer 22 of a first semiconductor electromechanical sensor 20 in accordance with the present invention. The first wafer 22 has two elongated rectangular holes 24 extending through it. The two holes are aligned parallel to each other such that a portion of the first wafer 22 extending between the holes 24 constitutes a beam 26 which is substantially coplanar with an unlaminated surface of the first wafer 22.

FIG. 2 provides a cross-sectional view of the sensor 20 of FIG. 1. The sensor 20 includes first and second silicon wafers, 22 and 28. Each wafer comprises single crystal silicon doped with an N-type background dopant.

The first silicon wafer 21 is laminated to the second silicon wafer 28 by fusion bonding as described below in relation to FIGS. 8A–8H. Both an unlaminated surface 30 of the first wafer 22 and a laminated surface 32 of the first wafer 22 are substantially planar. A laminated surface 34 of the second wafer 28 also is substantially planar except for a recessed region 36 formed opposite the beam 26. The second wafer 28 also includes a substantially planar unlaminated surface that faces away from the first wafer 22. The unlaminated surface 38 of the second wafer 28 is thinned so as to define a diaphragm 39 that includes portions of the first and second wafers 22 and 28, bounded by thicker perimeter regions 40 which provide mechanical support for the sensor 20.

The respective laminated surfaces 32 and 34 of the first and second wafers 22 and 28 are aligned with one another such that the elongated rectangular holes 24 extending through the first wafer 22 open into the recessed region 36 of the second wafer 28. The beam 26 is disposed between the two holes 24 and opposite the recessed region 36 of the second wafer 28.

As discussed more fully below, P type piezoresistive elements 45 and 47 are formed in the beam 26 of the first wafer 22. P type regions 50 and 53 also are formed in the first wafer 32. At the base of the recessed region 36 opposite the beam, a P region 74 is formed.

In a presently preferred embodiment of the invention, the diaphragm 39 is square in shape and measures approximately 2400 microns on each edge. The thickness of the diaphragm 39 is approximately 90 microns. The thickness of the first wafer 22 and the beam 26 formed therein is approximately 6 microns. The thickness of the perimeter regions 40 of the second wafer 28 is approximately 385 microns. The length of the beam is approximately 600 microns, and its width is approximately 40 microns. The vertical distance from the base of the recessed region 36 of the second wafer 28 to the beam 26 is approximately 2 microns.

The resonant frequency of the diaphragm 39 when no pressures are applied across it is approximately 200 KHz. The resonant frequency of the beam 26 with no pressures applied to it is approximately 110 KHz. The resonant frequency shift of the beam 26 is approximately ten percent (10%) with full-scale pressure applied across the diaphragm 39.

Thus, the resonant frequency of the diaphragm 39 as a whole is significantly different from the resonant frequency of the beam 26. Also, the resonant frequency shift of the diaphragm 39 under full-scale pressure is significantly less than the resonant frequency shift of the beam 26 under the same conditions.

In general, it is desirable that the resonant frequency of the diaphragm 39 be different than the resonant frequency of the beam 26 and that it be different than harmonic multiples of the resonant frequency of the diaphragm. If the resonant frequencies of the beam 26 and the diaphragm 39 as a whole are not significantly different, then vibrational energy of the beam 26 could be more readily lost to the diaphragm resulting in a reduced value of Q, the quality factor of oscillation of the beam 26.

FIG. 3 is a top plan view of the first wafer 22. The parallel rectangular holes 24 are indicated by dashed lines on either sides of the beam 26. The diaphragm 39 is disposed within dashed lines 41. Four piezoresistive elements 45–48 are formed in the first wafer 22. The four piezoresistive elements are electrically coupled in a Wheatstone Bridge circuit by respective P+ type regions 49–54.

More specifically, P+ region 49 is electrically coupled to metallic contact 55 and to piezoresistive element 48. P+ region 50 is electrically coupled to metallic contact 56 and to piezoresistive elements 47 and 48. P+ region 51 is electrically coupled to metallic contact 57 and to piezoresistive element 47. P+ region 52 is electrically coupled to metallic contact 58 and to piezoresistive element 45. P+ region 53 is electrically coupled to metallic contact 59 and to piezoresistive elements 45 and 46. Finally, P+ region 54 is electrically coupled to metallic contact 60 and to piezoresistive element 46.

Piezoresistive elements 45 and 47 are formed in the beam 26. In the preferred embodiment, a crystallographic direction extending generally along a longitudinal axis of the beam 26 between piezoresistive elements 45 and 47 is the (110) direction. This orientation of the beam 26 places the principal stress axis of the beam 26 in alignment with the direction of greatest stress sensitivity of the P-type piezoresistive elements. In general P-type piezoresistive elements on a <100> oriented silicon crystal are most sensitive to stresses applied in the (110) direction.

First and second temperature sensing resistors 62 and 64 are formed in diametrically opposite corners of the first wafer 22. The first temperature sensing resistor 62 is electrically coupled between metallic contacts 66 and 68, and the second temperature sensing resistor 64 is electrically coupled between metallic contacts 70 and 72. As an alternative, diodes could be used for temperature sensing instead of resistors 62 and 64.

Figure 4:
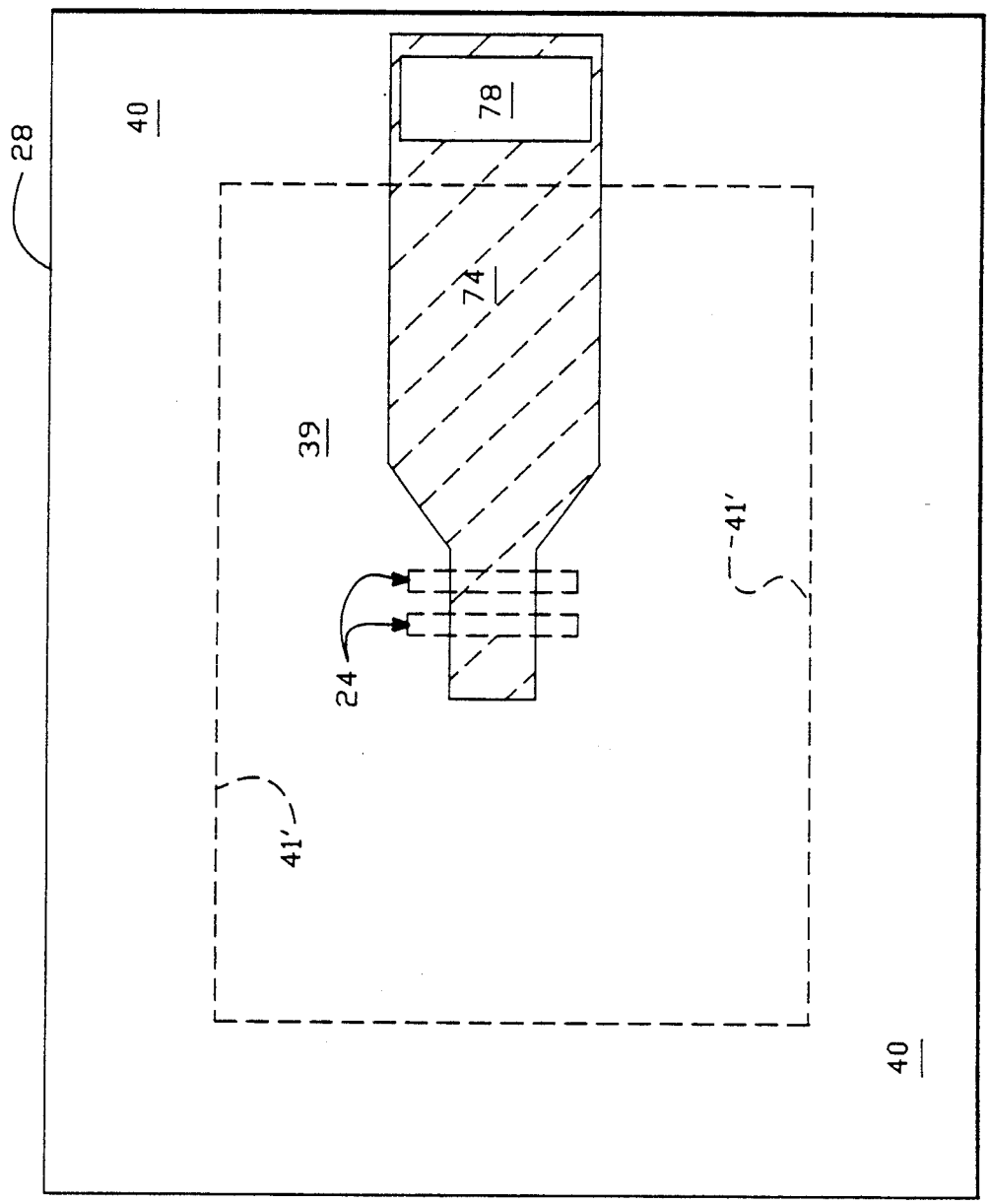
FIG. 4 is a top plan view of a second wafer of the sensor of FIG. 1.

FIG. 4 is a top plan view of the second wafer 28. The diaphragm 39 is disposed within dashed lines 41'. Although holes 24 are formed in the first wafer 22, dashed lines labelled 24 are provided in FIG. 4 to indicate the spatial relationship of the structures in the second wafer 28 to those in the first wafer 22. The P region 74 is shown to be electrically coupled to metallic contact 78 formed in the perimeter region 40. The P region 74 extends to a portion of the diaphragm 39 disposed opposite the two holes 24 and the beam 26 of the first wafer 22. The P region 74 serves as a drive electrode for electrically stimulating vibration of the beam 26.

Figure 5:
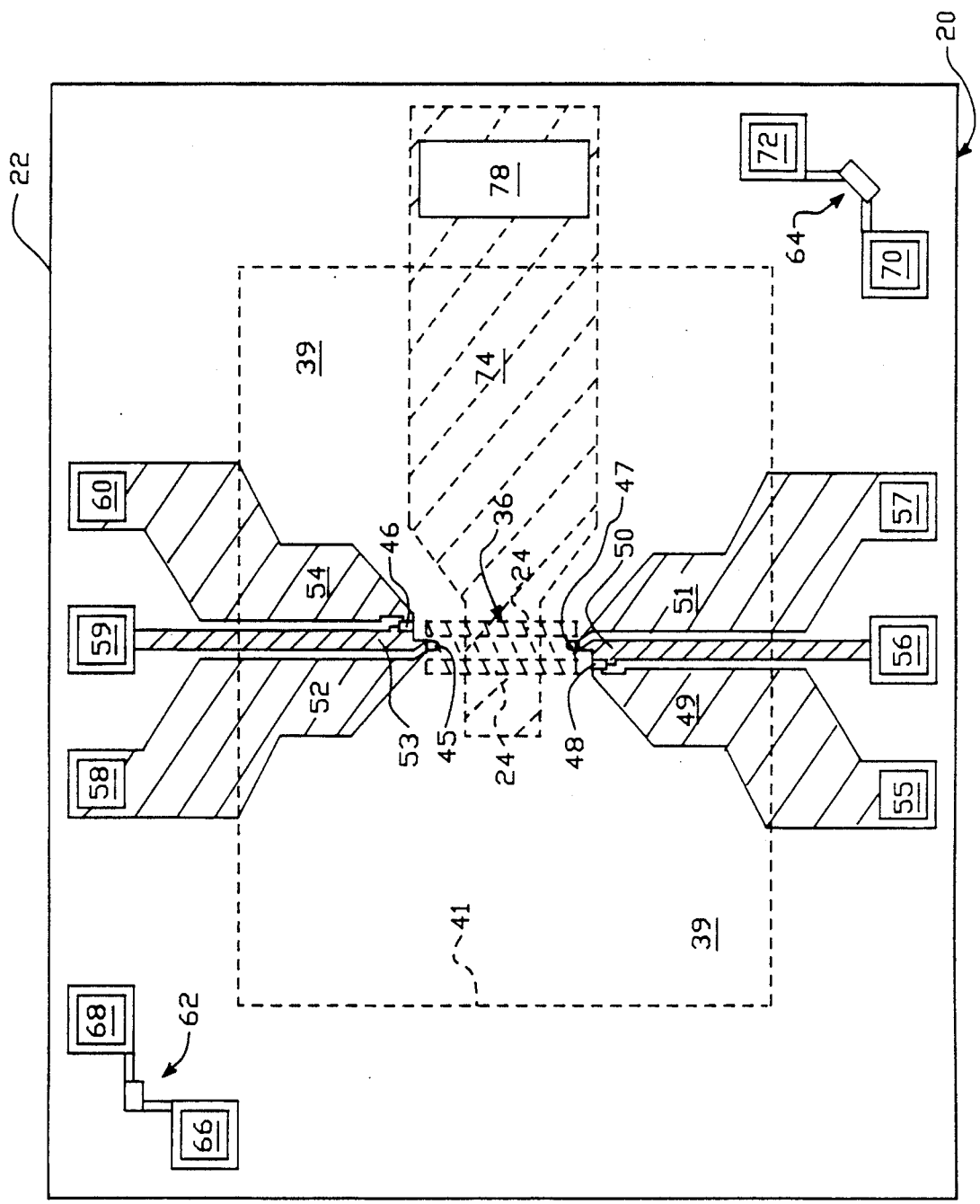
FIG. 5 is a top plan view of the wafers of FIGS. 3 and 4 shown superimposed one on top of the other.

FIG. 5 provides a top plan view of the sensor 20 in which the first and second wafers 22 and 28 are shown superimposed one on top of the other. This view illustrates the spatial relationship between the beam 26, the rectangular holes, indicated by dashed lines labelled 24, and the various regions of the first and second wafers 22 and 28. The recessed region 36 beneath the beam 26 is indicated by diagonal-dashed lines.

In operation, the drive electrode defined by P region 74 is used to provide a periodically varying electrostatic field to the beam 26 such that the beam 26 vibrates at its resonant frequency. It will be appreciated that the beam 26 has two nodal points of oscillation in its fundamental mode of operation. Those nodal points are in the regions at opposite ends of the beam 26 where it is secured to the major planar body of the first wafer 22.

Referring once again to FIG. 2, in operation, when a net force F is applied to the unlaminated surface 38 of the second wafer 28, a slight flexing of the diaphragm 39 in the direction of the net force F results. Since the first and second wafers 22 and 28 are laminated together, the flexure of the diaphragm 39 results in the application of a tensile force $F_T$ to the beam 26. Changes in the tensile force $F_T$ applied to the beam 26 result in a shift in its resonant vibrational frequency.

As the beam vibrates at its resonant frequency, signal processing circuitry (not shown) can be used to determine the periodicity of variations in the offset of Wheatstone Bridge circuit which includes piezoresistive elements 45-48. The offset periodically varies due to the vibration of the beam 26. The periodicity of such variations depends upon the resonant frequency of the beam 26 which, in turn, depends upon the tensile force $F_T$ applied to it.

Thus, the diaphragm 39 couples mechanical stress to the beam 26. The net force F applies a mechanical stress to the diaphragm 39, and the diaphragm couples that mechanical stress to the beam 26 as a tensile stress. As a consequence, variations in the net force F can result in variations in the resonant vibrational frequency of the beam 26.

Figure 6:
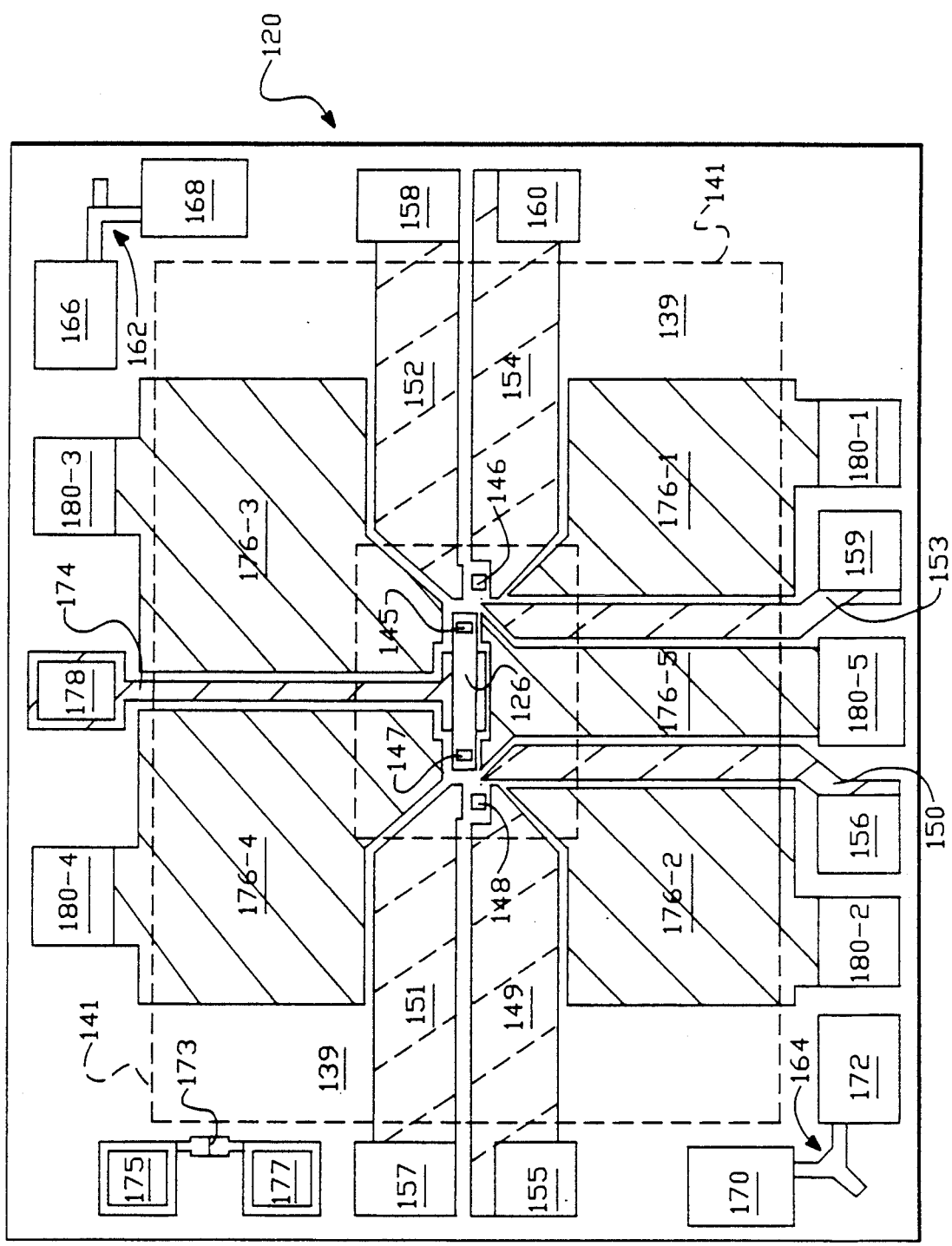
FIG. 6 is a top plan view of a first alternative embodiment of a sensor in accordance with the invention in which first and second wafers are shown superimposed one on top of the other.

Referring to the illustrative drawings of FIG. 6, there is shown a top plan view of a first alternative embodiment which includes a second semiconductor electromechanical sensor 120 in accordance with the invention. The second sensor 120 includes respective first and second silicon wafers shown superimposed one on top of the other so as to illustrate the physical relationship between regions of the sensor. A diaphragm 139 is bounded by dashed lines 141.

A first wafer 122 (described below) has two elongated rectangular holes 124 formed in it. A beam 126 is disposed in the first wafer 122 between the two holes 124. Four respective P-type piezoresistive elements 145-148 formed in the first wafer 122 are electrically coupled so as to form a Wheatstone Bridge circuit. Piezoresistive elements 145 and 148 are formed on beam 126. A crystallographic direction extending between piezoresistive elements 145 and 148 is a (110) direction.

Piezoresistive element 148 is electrically coupled to P+regions 149 and 150. Piezoresistive element 147 is electrically coupled to P+regions 150 and 151. Piezoresistive element 145 is electrically coupled to P+regions 152 and 153. Piezoresistive element 146 is electrically coupled to P+regions and 154. P regions 149-154 each are formed in the first silicon wafer 122, and are respectively electrically coupled to metallic contacts 155-160.

A ground plane in the form of N+regions 176-1 through 176-5 also is formed in the first wafer 122. The ground plane substantially prevents electrical coupling between the Wheatstone Bridge circuit and a drive electrode comprising a P+region 174 formed in the second wafer 128. The N+regions 176-1 through 176-5 are electrically coupled to respective metallic contacts 181-1 through 181-5. The P+region 174 is electrically coupled to metallic contact 178.

First and second temperature sensing resistors 162 and 164 are formed in diametrically opposite corners of the first wafer 122. The first temperature sensing resistor is formed between metallic contacts 166 and 168, and the second temperature sensing resistor is electrically coupled between metallic contacts 170 and 172. A temperature sensing p-n diode 173 is also formed in the first wafer between metallic contacts 175 and 177.

Figure 7:
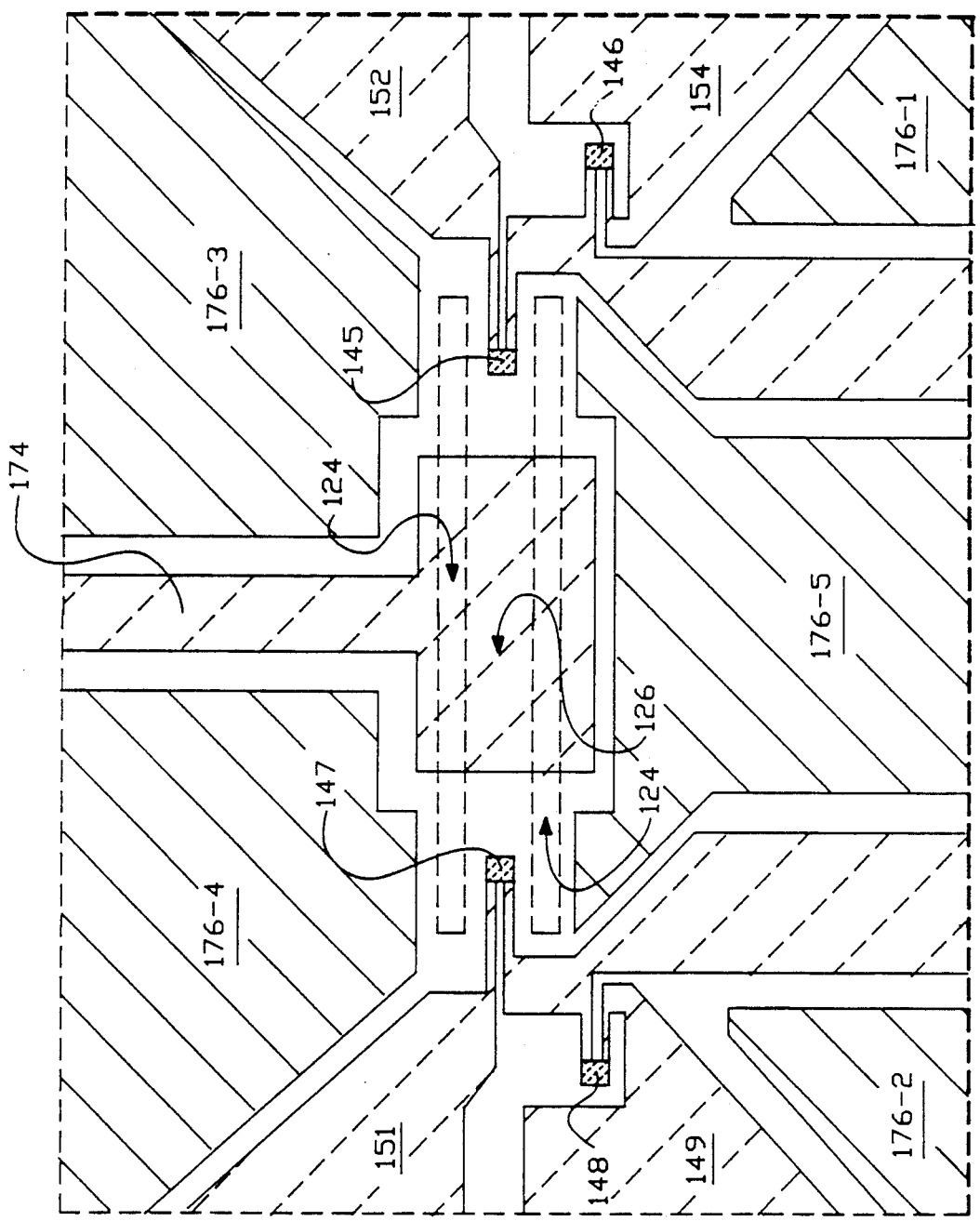
FIG. 7 is an enlarged top plan view of a region of the wafers of FIG. 6 shown within dashed lines.

Referring to the illustrative drawings of FIG. 7, there is shown an enlarged top plan view of the second sensor 120 in the region of the beam 126. The elongated rectangular holes 124 are indicated by dashed lines on either side of the beam 126. The P+region 174 forming the drive electrode includes an enlarged rectangular portion disposed opposite the beam 126. Piezoresistive elements 145 and 147 are located on the beam 126. Piezoresistive elements 146 and 148 are shown adjacent to the beam 126.

FIGS. 6 and 7 show that the multiple N+regions 176-1 through 176-5 of the guard resistor are contoured so as to substantially envelope both the Wheatstone Bridge circuit and the narrow region of the first wafer 122 opposite the drive electrode and having substantially the same shape as the P+region forming the drive electrode. This narrow region is doped with only the N-type background dopant. The ground plane substantially prevents electrical coupling between the drive electrode and the Wheatstone Bridge circuit.

FIGS. 8A-8H illustrate a method in accordance with the present invention for fabricating the second sensor 120 of FIGS. 6-7. Intermediate fabrication steps such as the growth of intermediate oxide and nitride layers, the deposition of photoresist layers and photolithographic patterning are well-known to those familiar with semiconductor fabrication and need not be described in detail.

Figure 8A:
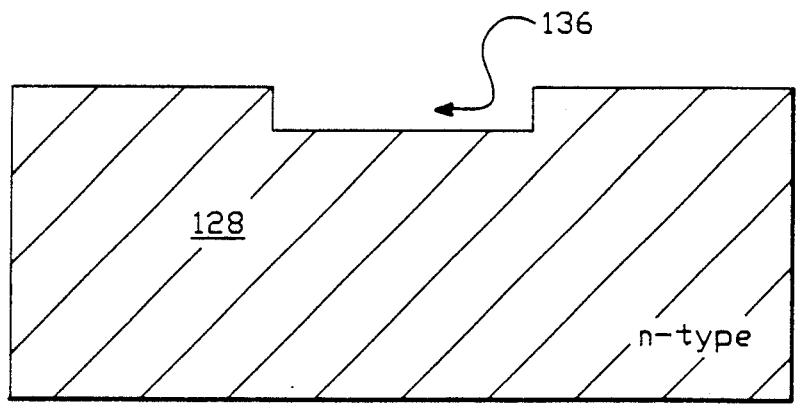

In the step shown in FIG. 8A, a single crystal <100> oriented silicon wafer 128 with an n-type dopant concentration of approximately $1.0 \times 10^{16}$ atoms per cubic centimeter is shown. The diaphragm 139 will be formed in this wafer 128. A shallow etch, approximately two micrometers deep, is formed in a first major surface of the wafer so as to form a recess 136 that will provide a gap between the diaphragm 139 and the beam 136.

Figure 8B:
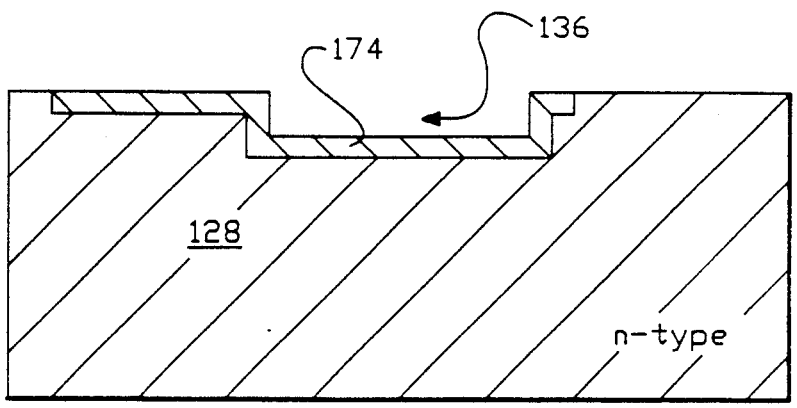

In the step illustrated in FIG. 8B, a shallow P+region 174 is formed in wafer 128. The P+region 174 can be formed by ion implantation. After the step of implantation, the P+region 174 is annealed to activate the impurity. The P+region 174 can be used as a drive electrode or as a capacitive sensing plate, or can be used to perform both functions.

Figure 8C:
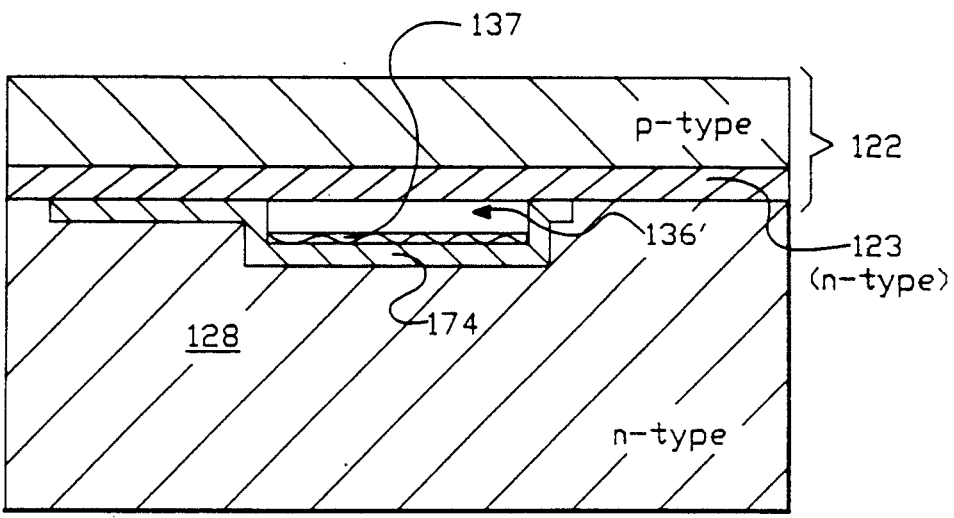

In the step illustrated in FIG. 8C, a single crystal <100> oriented P-type wafer 122 is fusion bonded to silicon wafer 128 as shown. During the fusion bonding step, the wafers 122 and 128 are made hydrophilic. That is, they are treated with an agent such as hot nitric acid or a hot sulfuric acid and hydrogen peroxide solution or another strong oxidant, that causes water to adhere to them. They are carefully aligned with respect to crystallographic direction. The two wafers then are placed in an oxidizing atmosphere at a temperature of 400° C.-1200° C. for approximately one hour. It will be appreciated, that after this fusion bonding step, the 2 micron deep recess 136 is enclosed between the wafers 122 and 128 so as to define a hermetically sealed cavity 136'.

During the fusion bonding step, care should be taken to ensure that the P-type dopant in P+region 174 is not thermally driven from wafer 128 in which the recess 136 is formed into the wafer 122 which encloses the cavity 136'. Such thermally induced movement potentially could cause electrical shorting between the bottom of the cavity 136' and the top of the cavity which potentially could degrade device operation. One method for preventing such thermally induced diffusion is to keep the ion implant dose used to form the P+region 174 at approximately $2.0 \times 10^{14}$ atoms per cubic centimeter or less and to leave in place a silicon dioxide layer 137 approximately 2000 Angstroms thick on the bottom of the etched cavity during the fusion bonding process.

It will be appreciated that the silicon fusion bonding technique described above bonds the first and second wafers 122, 128 together without the use of an intermediate glue material that could have a different coefficient of thermal expansion than the single crystal silicon wafers. Furthermore, fusion bonding can be performed in which oxide or nitride layers have been formed in the bonded surfaces of one or both of the wafers 122, 128.

In the step illustrated in FIG. 8D, the unbonded surface of P-type wafer 122 is mechanically ground to reduce its thickness and is mechanically polished to produce a smooth surface. The unbonded surface of wafer 122 then is subjected to a chemical etchant to reduce the total thickness of the wafer 128 to approximately five micrometers.

An advantageous method for performing this chemical etching step is to employ an electrochemical etch-stop such as that described by B. Kloeck, et al., in "Study of Electrochemical Etch-Stop for High-Precision Thickness Control of Silicon Membranes," IEEE Transactions on Electron Devices, Volume 36, Number 4, April 1989, which is expressly incorporated herein by this reference.

The etching method requires the formation of a p-n junction approximately five micrometers deep with reference to the bonded surface of wafer 122 prior to the fusion bonding step. The p-n junction can be formed by growing a lightly doped n-type epitaxial layer 123 having an n-type impurity concentration of approximately $1.0 \times 10^{10}$ to $7.0 \times 10^{19}$ atoms per cubic centimeter on the bonded surface of the p-type wafer 122 prior to the fusion bonding step. In order to ensure electrical contact between the wafers during the electrochemical etch-stop technique, the n-type epitaxial layer 123 is fusion bonded to the n-type wafer 128 during the fusion bonding step described above.

In the step illustrated in FIG. 8E, electronic components are formed in the unbonded surface of the wafer 122 using methods well known to those skilled in the art of silicon fabrication. P-type piezoresistive elements 145, 147 (only one is shown) are formed on the first wafer 122 at opposite ends of the resonant beam 126 which is formed later in the fabrication process as explained below. Additionally, n-type ground plane regions 176-1 through 176-5 (only one is shown) are formed on the first wafer 122 so as to minimize crosstalk from the P+region 174, which forms the drive electrode, and the p-type piezoresistive pick-up resistors during operation. Also, sensing resistors 162, 164 (not shown) and p-n diode 173 (not shown) are formed on the first wafer 122 to monitor temperature of the sensor 120 in order to compensate for any temperature coefficients of resistance or sensitivity or frequency.

In the step illustrated in FIG. 8F, plasma etching is used to gain electrical access to the buried P+region 174. After the plasma etching step, a p-type implant is used to ensure that the exposed etched surface is p-type and makes electrical contact with the buried P+region 174. Additionally, electrical contact holes are etched through on insulating silicon dioxide layer 125 that covers the unbonded surface of the wafer 122 as a result of the typical fabrication steps described above. These additional contact holes provide electrical access to the n-type ground plane, to the piezoresistive elements and to other electrical components of the sensor 120.

During this step of contact hole etching, portions of the silicon dioxide layer 125 also are removed from the beam region of the wafer 122 except in regions where it is required to insulate the piezoresistive elements. Silicon dioxide has a different thermal expansion coefficient than silicon. The temperature coefficient of frequency of the silicon beam 126 advantageously is minimized by removing such portions of the silicon dioxide layer 125 from the beam region.

In the step illustrated in FIG. 8G, a plasma etch is performed in order to form the two elongated holes 124 that straddle the beam 126. The holes 124 are formed such that the crystallographic direction through the longitudinal axis of the beam is the (110) direction in the <100> oriented wafer 122.

In the step shown in FIG. 8H, the unbonded surface of wafer 128 is chemically etched to define the diaphragm 139. In a presently preferred method for etching the wafer 128, a solution of aqueous potassium hydroxide is used to etch a recess which defines the diaphragm 139. Regions of the unbonded surface of the wafer 128 in which no etching is to occur are protected by a deposited layer of silicon nitride. The diaphragm 139 has a thickness of approximately 100 micrometers for one atmosphere full-scale pressure range. It will be appreciated that other chemical etch techniques can be used to etch the diaphragm 139 without departing from the invention.

The etch step of FIG. 8H can be performed either before or after the plasma etch step described with respect to FIG. 8G. During the etch step of FIG. 8G, the unbonded surface of wafer 122 can be protected from the aqueous potassium hydroxide solution by any of several means such as mechanically clamped fixtures or waxed-on plates of glass or silicon, which prevent the etch solution from degrading the unbonded surface of wafer 122.

It will be appreciated that, although the preferred embodiments discussed above have been described in relation to an n-type substrate and p-type piezoresistive elements, the invention can be practiced using a p-type substrate and n-type piezoresistive elements. Furthermore, the first and second wafers alternatively can be formed from <110> oriented single crystal silicon without departing from the invention.

The above-described embodiment and method are merely illustrative of many possible specific embodiments and methods which can represent the principles of the invention. Numerous and varied other arrangements and methods can be readily devised in accordance with these principals without departing from the spirit and scope of the invention.

Figure 9:
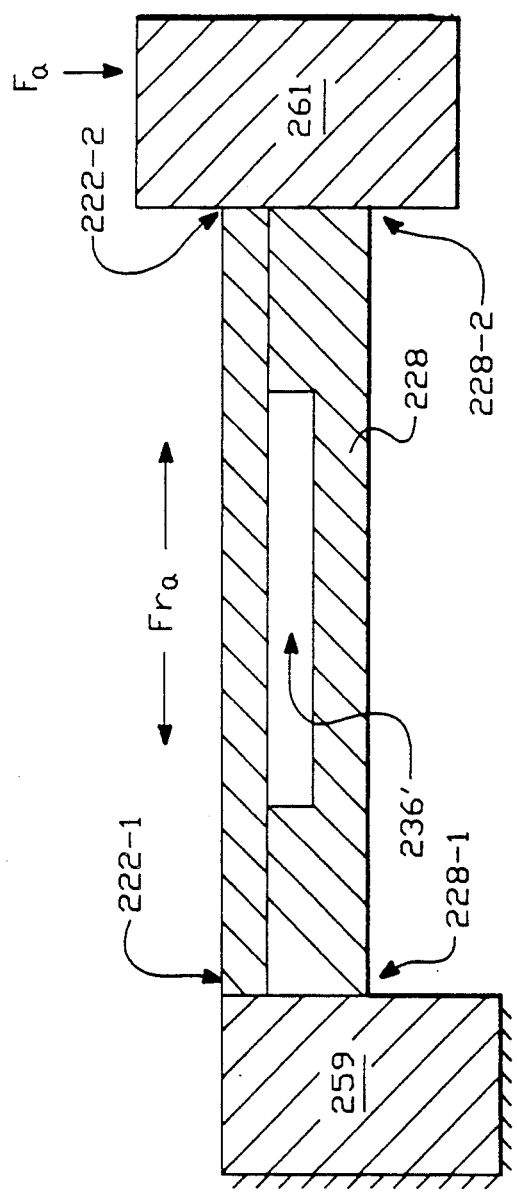
FIG. 9 is a cross-sectional view of a second alternative embodiment of a sensor in accordance with the invention.

For example, the illustrative drawings of FIG. 9 show a cross-sectional view of a second alternative embodiment of the invention in which a second sensor 220 includes first and second single crystal silicon wafers 222, 228. The first wafer defines a beam 226 disposed opposite a cavity 236'. The first and second wafers 222, 228 include first distal portions 222-1, 228-1 secured to a fixture 259. The first and second wafers 222, 228 also include second distal portions 222-2, 228-2 secured to a seismic mass 261. It will be appreciated that the second sensor 220 also can include electrical components which, for the sake of simplicity, are not shown.

In operation, when the seismic mass 261 is exposed to a force such as a force $F_a$ due to acceleration, the first wafer 222 is subjected to a tensile force $F_{Ta}$ which can alter the resonant frequency of the beam 226. Thus, the seismic mass 261 couples mechanical stress to the beam 226.

Figure 10:
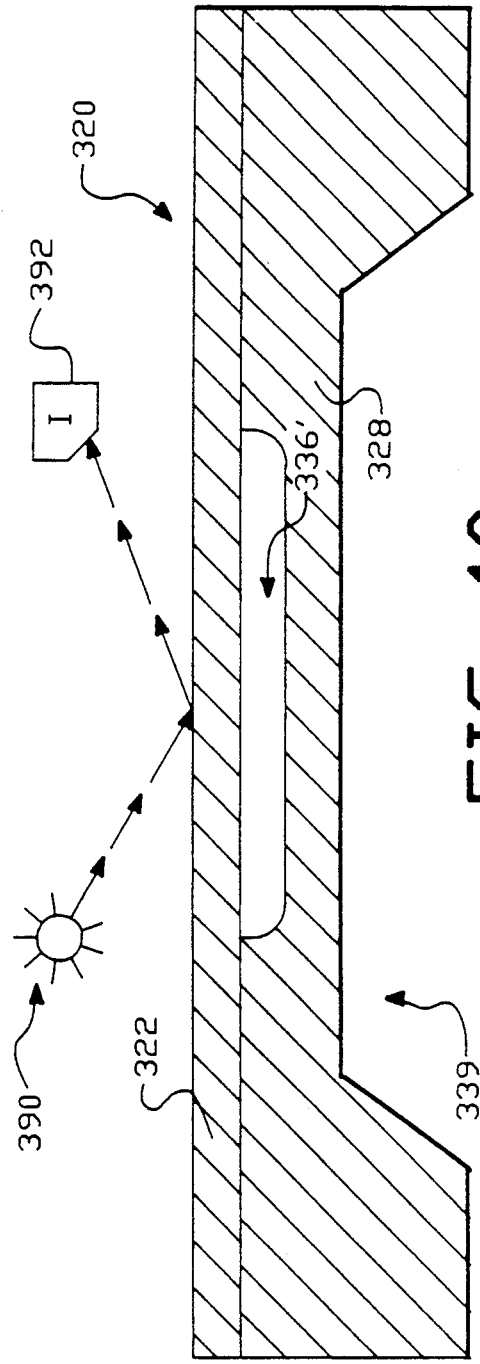
FIG. 10 is a cross-sectional view of a third alternative embodiment of a sensor in accordance with the invention.

FIG. 10, for example, illustrates an alternative approach to stimulating vibration of a vibratable beam and for measuring the resonant frequency of vibration of the vibratable beam without departing from the invention. FIG. 10 shows a cross-sectional view of a fourth semiconductor electromechanical sensor 320 in accordance with the invention. The fourth sensor 320 includes first and second single crystal silicon wafers 322 and 328. The first wafer 322 includes an elongated beam 326 disposed opposite a recess 336' formed in the second wafer 328. The beam 326 and recess 336' are formed in a diaphragm 339 of the sensor 320. Unlike the first and second sensors 20 and 120, the fourth sensor 320 does not include a Wheatstone Bridge circuit or an electrode formed opposite the beam 326. A light source 390 provides pulses of light energy to the beam 326 that stimulate vibration of the beam 326. A reflectometer 392 receives light reflected from the beam. The reflected light can be used to measure the resonant frequency of the beam 326 in a manner that will be understood by those skilled in the art.

Another alternative embodiment (not shown) employs a wheatstone bridge circuit to thermally stimulate vibration of a vibratable beam. A piezoresistive element formed in the vibratable beam periodically has a current conducted through it. The periodic current flow imparts heat to the vibratable beam resulting in periodic expansions and contractions of the beam which stimulates vibration of the beam.

Another alternative embodiment (not shown) uses a capacitive pick-up electrode similar to the drive electrodes of the first and second sensors 20 or 120 to measure the resonant frequency of a vibratable beam. Measurement of periodic variations in the capacitance resulting from changes in the spacing of such a capacitive pick-up electrode and the vibratable element can be used to determine the resonant frequency of the vibratable element. It will be appreciated that a single electrode can function both to stimulate vibration of the vibratable element and to measure its resonant frequency.

Another alternative embodiment (not shown) employs magnetic drive to stimulate vibration of a vibratable element. More specifically, current is conducted through a conductor formed on the vibratable element which is placed in close proximity to and perpendicular to a fluctuating magnetic field. The result is vibration of the vibratable element.

Another alternative embodiment (not shown) employs piezoresistive drive to stimulate vibration of a vibratable element. More specifically, a voltage is periodically provided to a piezoresistor layer such as $ZnO_2$ formed on the vibratable element. As the layer expands and contracts in response to the periodic voltage, it stimulates vibration of the vibratable element.

Thus, the sensors of the presently preferred embodiments described in detail above advantageously provide single crystal silicon resonant beams which are lightly doped. More specifically, in the preferred embodiment the resonant beams have impurity concentrations of less than $7.0 \times 10^{19}$ atoms per cubic centimeter. Consequently, the single crystal silicon resonant beams possess thermal and electrical properties that are well-matched to those of the remainders of the first and second single crystal silicon wafers. Moreover, since the first and second wafers are fusion bonded together, their coefficients of thermal expansion also are well matched.

Due to the light doping concentrations of the beams, piezoresistive elements can be fabricated in the beams. Moreover, the beams can be oriented in the (110) direction in <100> oriented crystals, such that the principal stress axis of the beams is aligned with the direction of greatest sensitivity to stress of the piezoresistive elements. Additionally, the beams are coplanar with the unbonded surfaces of the first wafers which makes the beams easier to fabricate using photolithographic techniques and allows surface fiber stress in the first wafers to be more efficiently coupled into the beams.

Thus, the foregoing description is not intended to limit the invention which is defined by the appended claims in which what is claimed is:

1. An electromechanical sensor comprising:
   a first single crystal silicon wafer which defines a vibratable element;
   wherein said vibratable element is doped with less than approximately $7.0 \times 10^{19}$ dopant atoms per cubic centimeter; and
   a second single crystal silicon wafer which defines a shallow recessed region; and
   means for coupling mechanical stress from said second wafer to said vibratable element;
   wherein said first and second wafers are laminated together such that said vibratable element is disposed opposite said shallow recessed region.

2. The electromechanical sensor of claim 1, wherein a resonant frequency of said vibratable element varies in response to mechanical stress coupled to said vibratable element by said means for coupling.

3. The electromechanical sensor of claim 1, and further comprising:
   means for measuring resonant frequency of said vibratable element.

4. The electromechanical sensor of claim 1, and further comprising:
   means for measuring resonant frequency of said vibratable element;
   wherein said means for measuring includes at least one piezoresistive element.

5. The electromechanical sensor of claim 1, and further comprising:
   means for measuring resonant frequency of said vibratable element;
   wherein said means for measuring includes a plurality of piezoresistive elements coupled in a Wheatstone Bridge circuit.

6. The electromechanical sensor of claim 1, and further comprising:
   means for measuring resonant frequency of said vibratable element;

wherein said means for measuring includes at least one piezoresistive element; and means for substantially electrically isolating said at least one piezoresistive element from said means for measuring.

7. The electromechanical sensor of claim 6, wherein said means for substantially electrically isolating includes at least one p-n junction.

8. The electromechanical sensor of claim 1, and further comprising:

means for stimulating resonant vibration by said vibratable element.

9. The electromechanical sensor of claim 1, and further comprising:

means for stimulating resonant vibration by said vibratable element;

wherein said means for stimulating includes an electrode.

10. The electromechanical sensor of claim 1, and further comprising:

means for stimulating resonant vibration by said vibratable element; and means for substantially electrically isolating said electrode from said vibratable element.

11. The electromechanical sensor of claim 10, wherein said means for substantially electrically isolating includes a p-n junction.

12. The electromechanical sensor of claim 1, wherein said means for coupling comprises a diaphragm.

13. The electromechanical sensor of claim 1, wherein said means for coupling comprises a diaphragm and said vibratable element is formed on said diaphragm.

14. The electromechanical sensor of claim 1, wherein said means for coupling comprises a seismic mass secured to said first and second wafers.

15. The electromechanical sensor of claim 1, wherein said first and second wafers respectively include respective first and second distal portions; and further comprising:

fixture means for maintaining said first distal portions of said first and second wafers in a substantially fixed position;

wherein said means for coupling includes a seismic mass secured to respective second distal portions of said first and second wafers.

16. The electromechanical sensor of claim 1, wherein said first and second wafers are fusion bonded together.

17. The electromechanical sensor of claim 1, wherein said first and second wafers are fusion bonded together;

wherein said vibratable element includes a beam; and wherein an unbonded surface of said first wafer is substantially planar and said beam includes a surface that is substantially co-planar with said unbonded surface of said first wafer.

18. The electromechanical sensor of claim 1, wherein said first silicon wafer defines at least two holes extending therethrough adjacent to said vibratable element.

19. The electromechanical sensor of claim 1, wherein said vibratable element includes a beam fixed to said first wafer at opposite ends of said beam and extending between holes formed in said first wafer.

20. The electromechanical sensor of claim 1, wherein said first and second wafers define a diaphragm which includes a recessed region formed in said second wafer; and wherein said vibratable element includes a beam fixed to said first wafer at opposite ends of said beam and extending between holes formed in said first wafer.

21. The electromechanical sensor of claim 1, wherein said first and second wafers are fusion bonded together;

wherein a recessed region is formed in said second wafer; and wherein said vibratable element is disposed opposite said recessed region.

22. The electromechanical sensor of claim 1, and further comprising:

means for measuring resonant frequency of said vibratable element;

wherein said first and second wafers are fusion bonded together;

wherein a recessed region is formed in said second wafer;

wherein said vibratable element is disposed opposite said recessed region; and wherein said means for measuring includes an electrode formed in said recessed region opposite said vibratable element.

23. The electromechanical sensor of claim 1, and further comprising:

means for stimulating vibration of said vibratable element;

wherein said first and second wafers are fusion bonded together;

wherein a recessed region is formed in said second wafer;

wherein said vibratable element is disposed opposite said recessed region; and wherein said means for stimulating includes an electrode formed in said recessed region opposite said vibratable element.

24. The electromechanical sensor of claim 1, wherein said vibratable element is doped with substantially the same impurity concentration as a background doping concentration of said first wafer.

25. The electromechanical sensor of claim 1, wherein said first and second wafers each are doped with n-type background dopants.

26. The electromechanical sensor of claim 1, and further comprising:

at least one piezoresistive element formed in said vibratable element;

wherein said vibratable element comprises an elongated beam.

27. The electromechanical sensor of claim 26, wherein said first wafer is a <100> oriented wafer; and wherein said beam has a longitudinal axis substantially aligned along a (110) direction in said first wafer.

28. The electromechanical sensor of claim 26, wherein said first wafer is a <100> oriented wafer; and wherein said beam has a longitudinal axis substantially aligned along a (100) direction in said first wafer.

29. The electromechanical sensor of claims 27 or 28, wherein said first and second wafers each are doped with n-type background dopants; and said at least one piezoresistor is p-type.

30. The electromechanical sensor of claim 1, and further comprising:

at least one piezoresistive element formed in said vibratable element.

31. The electromechanical sensor of claim 1, wherein said vibratable element includes an elongated beam.

32. The electromechanical sensor of claim 31, wherein said first wafer is a <100> oriented wafer; and
wherein said beam has a longitudinal axis substantially aligned along a (110) direction in said first wafer.

33. The electromechanical sensor of claim 31,
wherein said first wafer is a <100> oriented wafer; and
wherein said beam has a longitudinal axis substantially aligned along a (100) direction in said first wafer.

34. An electromechanical sensor comprising:
a first single crystal silicon wafer which defines a vibratable element;
a second single crystal wafer which defines a shallow recessed region; and
means for coupling mechanical stress from said second wafer to said vibratable element;
wherein said first and second wafers are fusion bonded together such that said vibratable element is disposed opposite said shallow recessed region.

35. The apparatus of claim 34, wherein said vibratable element is doped with less than approximately $7.0 \times 10^{19}$ dopant atoms are cubic centimeter.

36. The electromechanical sensor of claim 34, wherein a resonant frequency of said vibratable element varies in response to mechanical stress coupled to said vibratable element by said means for coupling.

37. The electromechanical sensor of claim 34, and further comprising:
means for measuring resonant frequency of said vibratable element.

38. The electromechanical sensor of claim 34, and further comprising:
means for measuring resonant frequency of said vibratable element;
wherein said means for measuring includes at least one piezoresistive element.

39. The electromechanical sensor of claim 34, and further comprising:
means for measuring resonant frequency of said vibratable element;
wherein said means for measuring include a plurality of piezoresistive elements coupled in a Wheatstone Bridge circuit.

40. The electromechanical sensor of claim 34, and further comprising:
means for measuring resonant frequency of said vibratable element;
wherein said means for measuring includes at least one piezoresistive element; and
means for substantially electrically isolating said at least one piezoresistive element from said means for measuring.

41. The electromechanical sensor of claim 40, wherein said means for substantially electrically isolating includes at least one p-n junction.

42. The electromechanical sensor of claim 34, and further comprising:
means for stimulating resonant vibration by said vibratable element.

43. The electromechanical sensor of claim 34, and further comprising:
means for stimulating resonant vibration by said vibratable element;
wherein said means for stimulating includes an electrode.

44. The electromechanical sensor of claim 34, and further comprising:
means for stimulating resonant vibration by said vibratable element; and
means for substantially electrically isolating said electrode from said vibratable element.

45. The electromechanical sensor of claim 44, wherein said means for substantially electrically isolating includes a p-n junction.

46. The electromechanical sensor of claim 34, wherein said means for coupling comprises a diaphragm.

47. The electromechanical sensor of claim 34, wherein said means for coupling comprises a diaphragm and said vibratable element is formed on said diaphragm.

48. The electromechanical sensor of claim 34, wherein said means for coupling comprises a seismic mass secured to said first and second wafers.

49. The electromechanical sensor of claim 34, wherein said first and second wafers respectively include respective first and second distal portions; and further comprising:
fixture means for maintaining said first distal portions of said first and second wafers in a substantially fixed position;
wherein said means for coupling includes a seismic mass secured to respective second distal portions of said first and second wafers.

50. The electromechanical sensor of claim 34,
wherein said vibratable element includes a beam; and
wherein an unbonded surface of said fist wafer is substantially planar and said beam includes a surface that is substantially co-planar with said unbonded surface of said first wafer.

51. The electromechanical sensor of claim 34, wherein said first silicon wafer defines at least two holes extending therethrough adjacent to said vibratable element.

52. The electromechanical sensor of claim 34, wherein said vibratable element includes a beam fixed to said first wafer at opposite ends of said beam and extending between holes formed in said first wafer.

53. The electromechanical sensor of claim 34,
wherein said first and second wafers define a diaphragm which includes a recessed region formed in said second wafer; and
wherein said vibratable element includes a beam fixed to said first wafer at opposite ends of said beam and extending between holes formed in said first wafer.

54. The electromechanical sensor of claim 34,
wherein a recessed region is formed in said second wafer; and
wherein said vibratable element is disposed opposite said recessed region.

55. The electromechanical sensor of claim 34, and further comprising:
means for measuring resonant frequency of said vibratable element;
wherein a recessed region is formed in said second wafer;
wherein said vibratable element is disposed opposite said recessed region; and wherein said means for measuring includes an electrode formed in said recessed region opposite said means for vibrating.

56. The electromechanical sensor of claim 34, and further comprising:
   means for stimulating vibration of said vibratable element;
   wherein a recessed region is formed in said second wafer;
   wherein said vibratable element is disposed opposite said recessed region; and
   wherein said means for stimulating includes an electrode formed in said recessed region opposite said vibratable element.

57. The electromechanical sensor of claim 34, wherein said vibratable element is doped with substantially the same impurity concentration as a background doping concentration of said first wafer.

58. The electromechanical sensor of claim 34, wherein said first and second wafers each are doped with n-type background dopants.

59. The electromechanical sensor of claim 34, and further comprising:
   at least one piezoresistive element formed in said vibratable element;
   wherein said vibratable element comprises an elongated beam.

60. The electromechanical sensor of claim 59, wherein said first wafer is a <100> oriented wafer; and
   wherein said beam has a longitudinal axis substantially aligned along a (110) direction in said first wafer.

61. The electromechanical sensor of claim 59, wherein said first wafer is a <100> oriented wafer; and
   wherein said beam has a longitudinal axis substantially aligned along a (100) direction in said first wafer.

62. The electromechanical sensor of claims 57 and 58, wherein said first and second wafers each are doped with n-type background dopants; and
   said at least one piezoresistor is p-type.

63. The electromechanical sensor of claim 34, wherein said vibratable element includes an elongated beam.

64. The electromechanical sensor of claim 34, and further comprising:
   at least one piezoresistive element formed in said vibratable element.

65. The electromechanical sensor of claim 63, wherein said first wafer is a <100> oriented wafer; and
   wherein said beam has a longitudinal axis substantially aligned along a (110) direction in said first wafer.

66. The electromechanical sensor of claim 63, wherein said first wafer is a <100> oriented wafer; and
   wherein said beam has a longitudinal axis substantially aligned along a (100) direction in said first wafer.

67. An electromechanical sensor comprising:
   a first single crystal silicon wafer which defines a vibratable beam;
   at least one piezoresistive element formed in said vibratable beam;
   a second single crystal silicon wafer which defines a first shallow recessed region;
   means for coupling mechanical stress from said second wafer to said vibratable beam;
   wherein said first and second wafers are laminated together such that said vibratable beam is disposed opposite said shallow recessed region.

68. The electromechanical sensor of claim 67, wherein a resonant frequency of said vibratable beam varies in response to mechanical stress coupled to said vibratable beam by said means for coupling.

69. The electromechanical sensor of claim 67, and further comprising:
   an electrode formed in the shallow recessed region.

70. The electromechanical sensor of claim 67,
   wherein said first wafer includes <100> oriented single crystal silicon; and
   wherein said vibratable beam has a longitudinal axis that is substantially aligned along a (110) direction in said first wafer.

71. The electromechanical sensor of claim 67,
   wherein said first wafer includes <100> oriented single crystal silicon; and
   wherein said vibratable beam has a longitudinal axis substantially aligned along a (110) direction in said first wafer.

72. The electromechanical sensor of claim 67,
   wherein both said firs and second wafers are doped with n-type background dopant; and
   wherein said at least one piezoresistive element includes a p-type piezoresistive element.

73. The electromechanical sensor of claim 67,
   wherein said first wafer includes <100> single crystal silicon;
   wherein at least two piezoresistive elements are formed in said vibratable beam; and
   wherein an axis passing through said at least two piezoresistive elements is substantially aligned along a (100) direction in said first wafer;

74. The electromechanical sensor of claim 67,
   wherein said first wafer includes <110> single crystal silicon;
   wherein at least two piezoresistive elements are formed in said vibratable beam; and
   wherein an axis passing through said at least two piezoresistive elements is substantially aligned along a (100) direction in said first wafer.

75. The electromechanical sensor of claims 1, 34 or 67, wherein said second wafer defines said means for coupling.

76. The electromechanical sensor of claim 67, and further comprising:
   means for substantially electrically isolating said at least one piezoresistive element from said means for measuring.

77. The electromechanical sensor of claim 76, wherein said means for substantially electrically isolating includes at least one p-n junction.

78. The electromechanical sensor of claim 67, wherein said means or coupling comprises a diaphragm.

79. The electromechanical sensor of claim 67,
   wherein said means for coupling comprises a diaphragm; and
   wherein said vibratable beam is disposed on said diaphragm.

80. The electromechanical sensor of claim 67, wherein said means for coupling comprises a seismic mass secured to said first and second wafers.

81. The electromechanical sensor of claim 67, wherein said first and second wafers respectively include respective first and second distal portions; and further comprising:
   fixture means for maintaining said first distal portions of said first and second wafers in substantially fixed positions;
   wherein said means for coupling includes a seismic mass secured to respective second distal portions of said first and second wafers.

82. The electromechanical sensor of claim 67, wherein said first and second wafers are fusion bonded together.

83. The electromechanical sensor of claim 67, wherein said first and second wafers are fusion bonded together; and
   wherein an unbonded surface of said first wafer is substantially planar and said vibratable beam includes a surface that is substantially co-planar with said unbonded surface of said first wafer.

84. The electromechanical sensor or claim 67, wherein said vibratable beam is doped with substantially the same impurity concentration as a background doping concentration of said first wafer.

85. The electromechanical sensor of claim 67, and further comprising:
   a plurality of piezoresistive elements coupled in a Wheatstone Bridge circuit.

* * * * *